US006771798B1

(12) United States Patent
Haas et al.

(10) Patent No.: US 6,771,798 B1
(45) Date of Patent: Aug. 3, 2004

(54) HYPERSPECTRAL VISUALIZATION EXTENSIBLE WORKBENCH

(75) Inventors: Daniel G. Haas, Lothian, MD (US); John A. Antoniades, Fulton, MD (US); Mark M. Baumback, University Park, MD (US); Jeffrey H. Bowles, Alexandria, VA (US); John M. Grossman, Falls Church, VA (US); Peter J. Palmadesso, Manassas, VA (US); John Fisher, Annandale, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/433,367

(22) Filed: Nov. 3, 1999

Related U.S. Application Data
(60) Provisional application No. 60/107,038, filed on Nov. 3, 1998.

(51) Int. Cl.$^7$ ................................................. G06K 9/46
(52) U.S. Cl. ...................................... 382/103; 382/191
(58) Field of Search ................................. 382/103, 191, 382/286

(56) References Cited

U.S. PATENT DOCUMENTS

| | | | | |
|---|---|---|---|---|
| 5,341,439 A | * | 8/1994 | Hsu | 382/103 |
| 5,546,472 A | * | 8/1996 | Levin | 382/131 |
| 5,782,770 A | * | 7/1998 | Mooradian et al. | 600/476 |
| 6,008,492 A | * | 12/1999 | Slater et al. | 250/334 |
| 6,038,344 A | * | 3/2000 | Palmadesso et al. | 382/191 |
| 6,075,891 A | * | 6/2000 | Burman | 382/190 |
| 6,208,752 B1 | * | 3/2001 | Palmadesso et al. | 382/155 |
| 6,404,455 B1 | * | 6/2002 | Ito et al. | 348/169 |

OTHER PUBLICATIONS

Ren et al., "A Computer–Aided Detection and Classification Method for Concealed Targets in Hyperspectral Imagery." IEEE Int. Geoscience and Remote Sensing Symposium Proceedings, vol. 2, Jul. 6, 1998, pp. 1016–1018.*

Adams et al. "Simple Models for Complex Natural Surfaces: A Strategy for the Hyperspectral Era of Remote Sensing." 12$^{th}$ Canadian Symposium on Remote Sensing, IGARSS'89, vol. 1, Jul. 1989, pp. 16–21.*

Yu et al. Automatic Target Detection and Recognition in Multiband Imagery: A Unified ML Detection and Estimation Approach IEEE Trans. on Image Processing, vol. 6, No. 1, Jan. 1997, pp. 143–156.*

Robinson et al. "Comparison of Hyperspectral Sub–Pixel Detection With and Without A Priori Knowledge of Target Features." IEEE Aerospace Conference, vol. 5, Mar. 21, 1998, pp.183–189.*

Chang et al. "Least Squares Subspace Projection Approach to Mixed Pixel Classification for Hyperspectral Images." IEEE Trans. on Geoscience and Remote Sensing, vol. 36, No. 3, May 1998, pp. 898–912.*

* cited by examiner

Primary Examiner—Jon Chang
(74) Attorney, Agent, or Firm—John J. Karasek; L. George Legg

(57) ABSTRACT

A method for defining targets in hyperspectral image data of a scene, has the steps: (1) identifying a target within the scene; (2) fitting a plurality of conjoined hyperplanes about the target in the scene; and (3) fitting a shape to the identified target by shrinkwrapping the hyperplanes about the target by translating and rotating the hyperplanes until a specified fit parameter is satisfied.

3 Claims, 3 Drawing Sheets

HYPERSPECTRAL VISUALIZATION EXTENSIBLE WORKBENCH

CROSS-REFERENCE TO RELATED APPLICATION

This application claims priority of Provisional Application Serial No. 60/107,038 filed on Nov. 3, 1998 and incorporated herein by reference.

FIELD OF THE INVENTION

The present invention relates generally to a system for analysis and visualization of hyperspectral data and in particular, the present invention relates to a set of tools for visualization, data acquisition and data utilities for hyperspectral data.

DESCRIPTION OF THE RELATED ART

A hypersensor is a sensor which produces as its output a high dimensional vector or matrix consisting of many separate elements, each of which measures a different attribute of a system or scene under observation. A hyperspectral imaging system, in which the sensed attributes are different wavelength bands, is one example of a hypersensor.

One conventional technique for visualizing the output from a hypersensor is through the use of traditional, image thresholding techniques which implement binary thresholds, where a pixel is either black or white depending on whether it is larger or smaller than the threshold value. An example of a specific currently available system for analysis and visualization of hyperspectral images, is the Environment for Visualizing Images (ENVI), from Research Systems, Inc. The ENVI is a commercial remote sensing program which includes several tools for analysis and visualization of hyperspectral and multispectral data, as well as tools for geolocation and radar image processing. One limitation of ENVI is that it does not provide automatic contrast stretching and scrolling views, which are necessary for continuous data acquisition and display of very long data strips.

In addition to ENVI, other conventional analysis and visualization systems exist. However, these existing systems are designed for post-processing only, i.e., no pre-processing or data acquisition tools are provided, and thus the prior systems are very slow when dealing with data sets, particularly if the sets are multigigabyte in size.

There exists a need for an analysis and visualization system which includes additional features lacking in conventional analysis and visualization systems to provide enhanced visualization and analysis for continuous data acquisition and display of large data, to provide enhanced contrast and scrolling capabilities and to provide pre-processing data acquisition tools.

SUMMARY OF THE INVENTION

It is an object of this invention to provide an improved hyperspectral image analysis and visualization system.

Another object of the present invention is to provide a system for importing collected hyperspectral image data of a scene, identifying targets within that scene, and fitting a shape to the identified targets by shrinkwrapping hyperplanes about the target. Shrinkwrapping is used to select an optional simplex enclosing a set of exemplars determined from an initial screening process. The vertices of this simplex are referred to as endmembers. The role of shrinkwrapping is to select endmembers to represent the scene. Shrinkwrapping is an iterative process in which vertices of the simplex are moved until all data are enclosed by the simplex. In each iteration, faces, i.e., hyperplanes, are moved, i.e., translated and pivoted, until a specified fit parameter is satisfied. Thus, in accordance with the invention, targets are defined in the hyperspectral data of a scene by identifying the target within the scene, fitting a plurality of conjoined hyperplanes or faces about the identified target in the scene; and fitting a shape to the identified target by shrinkwrapping the hyperplanes about the target by translating and rotating the hyperplanes until a specified fit parameter is satisfied.

An additional object of the present invention is to provide a system for enhancing a hyperspectral image, by automatically stretching the image along one or more axes in one or more regions where a target is identified.

A further object of the present invention is to provide a system for enhancing a hyperspectral image by displaying a target on a screen at a higher brightness than the background, such as by displaying the target at full brightness, relative the background, and the background at a selected reduced brightness.

This and additional objects of the invention are accomplished by the structures and processes hereinafter described.

The present invention is adaptable to provide a graphical integration tool for the Intelligent Hypersensor Processing System ("IHPS") and its output. When so adapted, the present invention provides a framework for rapid contextual visualization of both hyperspectral raw and analyzed data. The framework further serves as a science product integration platform because of its abilities to accept plug-in modules, as well as entire models.

The present invention is further adaptable to provide a unique graphical front end, i.e., interface, configurable to accommodate multiple hyperspectral data analysis algorithms. For example, the present graphical interface can be adapted easily for numerous applications including the commercial satellite industry and other commercial remote sensing endeavors.

The analysis and visualization tools are adaptable to provide additional unique features specific to the exploitation of hyperspectral data. For example, in one specific embodiment, the present invention is adaptable to provide visualization of the output of the Optical Real-time Adaptive Spectral Identification System IHPS/("ORASIS") algorithm.

The present invention can also be adapted to accept data in real time from external sources such as from instruments, e.g., sensors, and from online archives.

One advantage of the present system over conventional systems is provided through its adaptation to function in real-time operation. The present system overcomes limitations in existing commercial programs, such as ENVI, which perform some of the operations of the present system. Unlike these conventional systems which require more elaborate procedures and much longer time, which precludes them from near real-time operation, the present system provides features to accommodate near real-time operation.

An additional advantage of the present system is provided through enhanced visualization of a target which is displayed on a darkened background.

Further features and advantages of the present invention will be set forth in, or apparent from, the detailed description of preferred embodiments thereof which follows.

BRIEF DESCRIPTION OF THE DRAWING

The invention will now be described in detail with respect to preferred embodiments with reference to the accompanying drawings, wherein.

DETAILED DESCRIPTION OF THE PREFERRED EMBODIMENT

The present invention provides a set of visualization and data acquisition utilities for hypersensors. For example, in one embodiment, the present system provides a platform for hyperspectral analysis. Various specific tools of the present platform implement the convex-set-based endmember construction method described in U.S. Pat. No. 6,038,344, herein incorporated by reference. These and other tools described in much greater detail below, provide further functionality to the ORASIS method, particularly in a real-time mode of operation.

Figure 1:
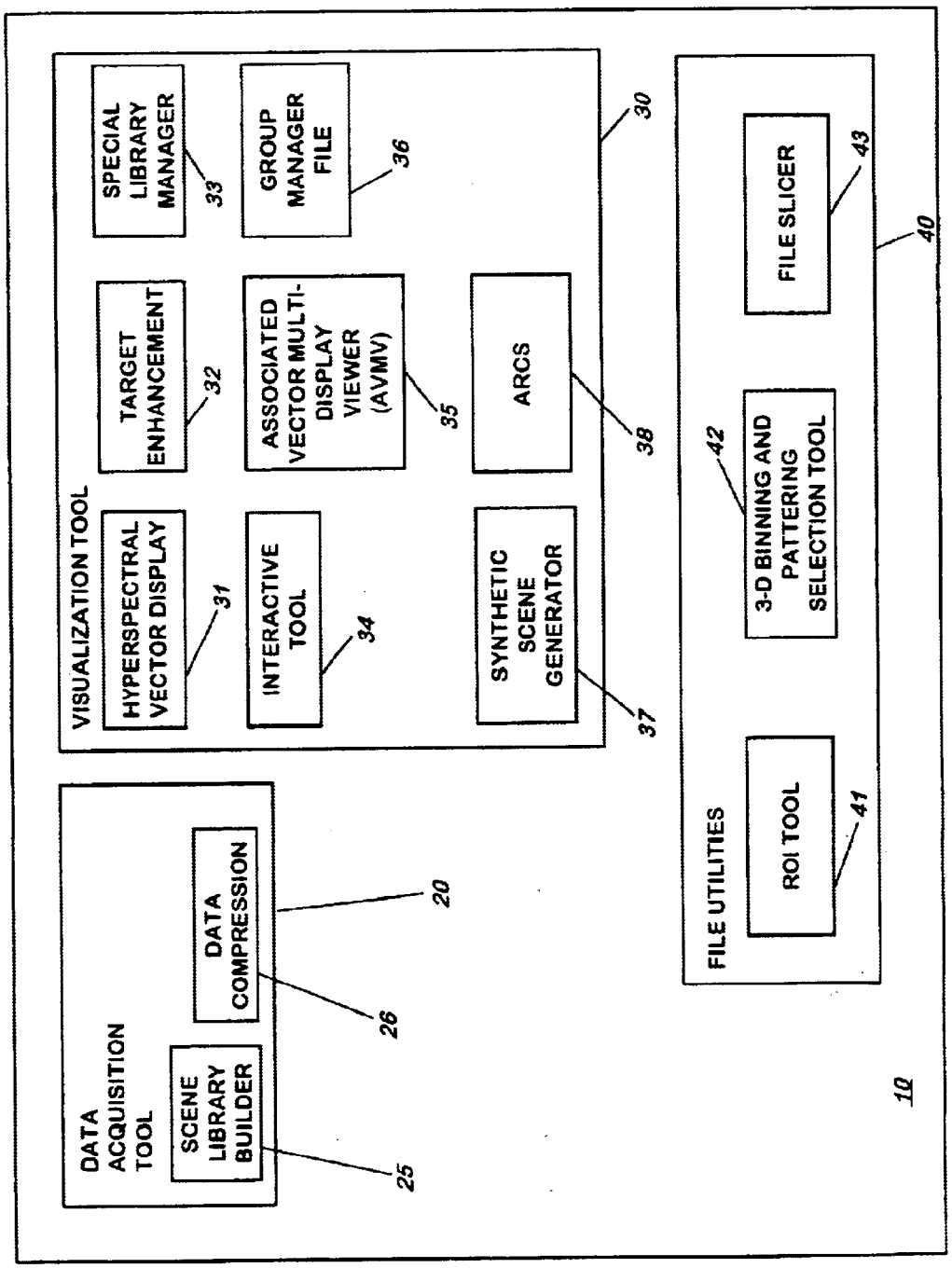
FIG. 1 is a schematic of a system for processing hyperspectral data according to the present invention.

Further understanding of the present system is provided with reference to one preferred embodiment depicted schematically in FIG. 1. System 10 includes a set of interactive hypersensor data acquisition tools 20, processing and visualization tools 30, and file utility tools 40. The system 10 can be implemented on numerous operating system platforms including Windows based PC computers, Macintosh and UNIX.

The data acquisition tools 20 provide objects for real-time processing, storage and display of hypersensor data. The objects include scrolling RGB panels for waterfall style display of composites of raw spectral bands, fraction maps or special maps, such as unlearned and saturated pixels, and target overlays.

The data acquisition tools 20 also provide direction of motion indicators, real-time target geolocation from aircraft position and attitude data, and automatic cueing of other sensors. The data acquisition tools 20 also provide the functionality of several image contrast linear and non-linear stretching methods with automatic line-by-line optimization and multilevel thresholding. Each display has an attached stretch method completely independent of the others.

In addition, the data acquisition tools 20 provide real-time automated tracking of endmembers of potential targets during the adaptive learning process and automated identification if one or more spectral libraries are activated.

One specific module of the data acquisition tools 20 is an automated scene library builder 25 which continuously updates the knowledge base from the active scene by automatically appending the non-redundant endmembers or salients to a current scene spectral library. The automated scene library builder 25 can also be used in a post-processing mode via the visualization tools 30 to create knowledge bases from the current scene.

The data acquisition tools 20 also include a data compression module 26 for providing data compression of the incoming data stream and storage of the output for replay during post-processing analysis as will be described below.

The data acquisition tools 20 also provide both automatic and manual endmember categorization and prioritization based on the shape of the histograms of the gray values of their matched filter outputs, the shape and/or size of the detected objects or user preferences for desirable or undesirable spectral signatures or object sizes.

Adjustable short term and long term memory for exemplars and signatures is advantageously provided by the data acquisition tools 20 to accommodate and adapt to changing terrain, lighting or weather conditions. The data acquisition tools 20 are adaptable to interface with the pruner module in an adaptive version of ORASIS where the pruner module determines the lifetimes of exemplars in the active set based on the age and priority of the current set members. Exemplar age is reset, each time an incoming spectrum is rejected by the exemplar, thus optimally extending the short term memory stay of low priority backgrounds. Therefore, it is advantageous for the present system 10 to vary memory size allocation to optimize memory usage.

Visualization tools 30 provide objects for post-processing, storage and display of hypersensor data. The visualization tools 30 include a hyperspectral vector display module 31, a target enhancement module 32, a spectral library manager module 33, an interactive tool module 34, an associated vector multidisplay view (AVMV) 35, a group manager file module 36, a synthetic scene generator 37 and an automated receiver operating characteristic curve scorer ARCS 38.

One function of the visualization tools 30 is to provide a graphical front end for the ORASIS method via a hyperspectral vector display module 31. The visualization tools 30 recognizes the interrelationships of the output products of ORASIS, as well as their formats. For example, the visualization tools 30 provide context sensitive representation of the ORASIS data products, utilizing the file extensions to identify whether the data represents two or three-dimensional data cubes, spatial image planes, text or binary lists, text files, vector files or group files. Knowledge of product relationships allows fast display of all related information during data analysis and product development phase of the ORASIS algorithm.

Target enhancement module 32 provides several image stretching methods for class and target contrast enhancement. These enhancements include linear and non-linear grayscale or thresholding based on percentages or mean and standard deviation techniques. Unlike traditional image thresholding techniques which implement binary thresholds, where a pixel is either black or white depending on whether it is larger or smaller than the threshold value, the system 10, via target enhancement module 32, implements a Target On Subdued Scene (TOSS) display method.

TOSS is a unique display method that highlights the targets by taking the targets, e.g., in color or gray scale pixels, in full brightness, relative to the background and overlays the targets on a color or grayscale image of the background that is darkened by an adjustable factor. The TOSS mode preserves the spatial context of the scene, while it provides enhanced ease of identification of the thresholded targets. TOSS provides an advantageous mode for tactical systems which utilize ORASIS, because the TOSS mode aids the image analysts in quick false alarm identification and terrain recognition.

The target enhancement module 32 is adaptable to also provide for the creation of reusable color schemes, which define the color bands and stretching parameters for each band that are used to create complex images, such as true color compositions, pseudo-color composites, and detection maps.

The graphical spectral library manager module 33 provides automated or interactive analysis and identification of spectral signatures. Arbitrary spectral from the image or libraries can be compared using the entire spectrum or spectral features extracted from scene endmembers, using the filter vectors as guides. Filter vectors automatically identify all of the important spectral features of each target in the current environment. For example, green signatures of camouflage are not as useful in a forest environment as they are in a desert environment. The graphical spectral library manager module 33 is adaptable to plot selected signatures overlaid in a line plot, to identify the degree of mismatch and to plot color patch arrays that quantify the mismatch for any combination of the selected plots.

A graphical programming batch language for complex sensor correction and manipulation of the data is integrated in the visualization tools 30. The basic operators in the program, as well as the individual transformations in user generated plug-in modules are represented by unique icons that are combined into a sequential batch program using conventional graphical user interface techniques of drag and drop. These complex transformations can be saved or edited for use with any appropriate data set.

The interactive tool module 34 provides for correction of detector response, and for spectral smile and sensor rotation, which are the two most common aberrations present in hyperspectral systems and which diminish conventional hyperspectral system utility. The interactive tool module 34 produces the data files necessary for automated image rectification by simple transforms or the icon based batch files.

The interactive tool module 34, in conjunction with hyperspectral vector display 31, provides for multiple interactive object oriented line graph and histogram windows. Profiles, both spectral or spatial, are inserted via a laser pointing to pixels on displayed images. Dynamic links allow the insertion of the profile from a compatible file linked to the displayed image. For example, a user could select a target highlighted in a fraction map of a thresholded display and automatically retrieve the spectrum of the pixel from the original data cube.

The visualization tools 30 provide "live" plot windows displaying the data. These windows are referred to as being "live" as the object oriented nature of system 10 allows for multiple windows of different types to receive new profiles from a single user input or selection such as via a keystroke or mouse click. The windows allow for toggling of trace normalization that provides for the direct comparison of spectral patterns independent of overall intensity. The plot windows can dynamically exchange data with each other and with the spectral library manager 33 using conventional drag and drop techniques associated with conventional graphic user interfaces.

The visualization tool 30 also implements the Associated Vector Multi-display Viewer, AVMV module 35. One skilled in the art will readily appreciate that ORASIS endmembers are the fundamental spectra which fully describe each scene and that the endmembers form the basis of a non-orthogonal spanning space, that encompasses every spectrum in the scene. Endmember originates as a salients, which are the "purest" pixels in the scene and are determined in the Gram-Schmidt section of the IHPS/ORASIS method, which also computes the orthogonal basis set that spans the space of these spectra. The basis vectors, are transformed into endmembers by the shrinkwrap algorithm of ORASIS. Once the endmembers are defined, ORASIS computes a set of filter vectors, which are matched filters that optimally demix the spectrum of each pixel. The four corresponding vectors, endmembers, salients, filter and basis vectors, form an Associated Vector Group (AVG).

Figure 2:
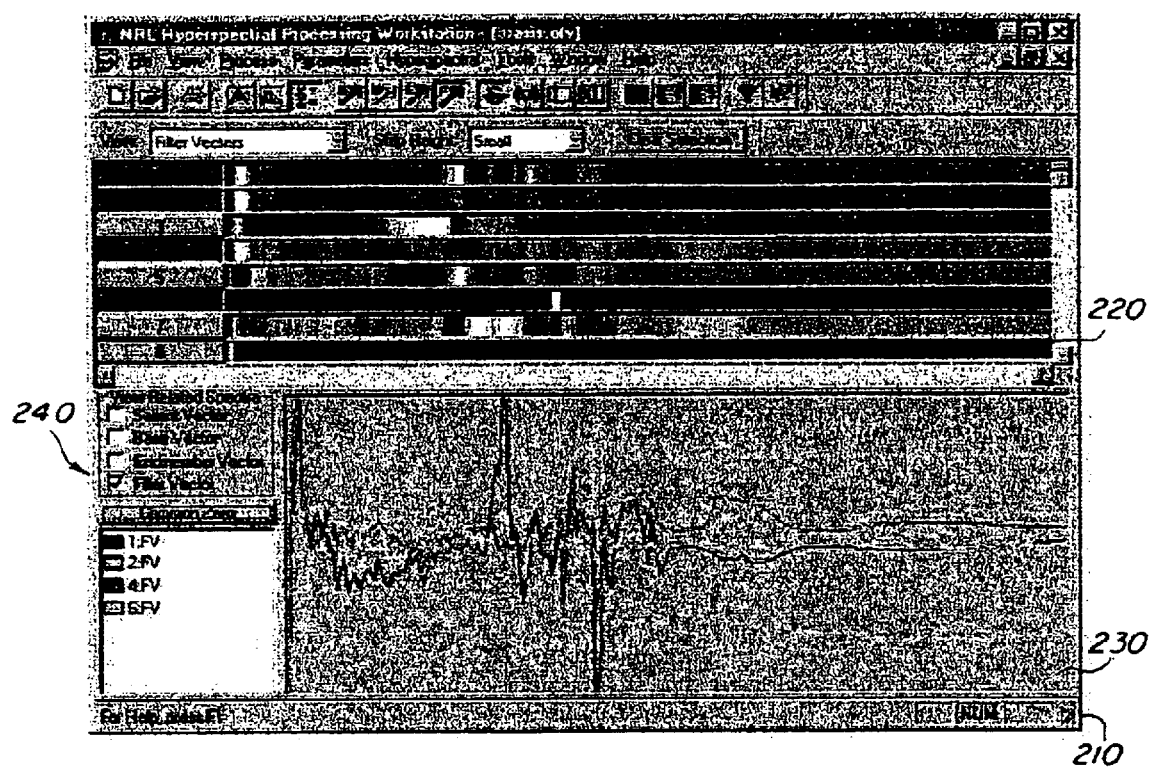
FIG. 2 is a graphic display of one display.

The AVMV 35 recognizes AVGs and displays them simultaneously as line plots and grayscale strip bitmaps. One screen display generated in association with the AVMV module 35 is the screen display of FIG. 2. The AVMV 35 includes a split panel display 210 in which the upper subpanel 220 displays one of the associated vector categories as stacked strip bitmaps. The lower subpanel 230 displays line graphs of any combination of the members of the AVGs, selected by a user via mouse clicking on radio buttons 240 which represent the four associated vectors.

The visualization tools 30 further provides image overlays that are advantageously, both characteristic of ORASIS processing and also serve as data fusion tools. The salients and exemplars from the scene can be overlaid on any type of display of the same scene as colored scatterplots. The present overlay display functionality allows for display of any single band, fraction map or mask of the scene as a background image. in a compound display. One can then overlay any number of similar images as colored grayscales with user assigned colors for each overlay. Each overlay can also be thresholded individually and dynamically.

The visualization tool 30 creates the Group Manager File 36, to allow rapid visualization of the results of the spectral analysis, and in particular, to effectively and efficiently process data from ORASIS. ORASIS analysis produces many pieces of information, contained in several files of different type. The output file extensions designate the data content and type. The basic types are data cubes such as input and output; vector files including endmembers, salients, filters, and exemplars; text files including control decks, and log files; text and binary list files such as exemplar origin pixel list; and salient origin. Quick access to the results of an ORASIS run is provided via a special list file referred to as a group file, which is a selectable via a clickable list of links to all of the files involved in the data analysis procedure.

The synthetic scene generator and artificial target implantation module, the synthetic scene generator 37, is provided, with an option to select an arbitrary set of fraction maps or color bands from an ORASIS processed data set. The synthetic scene generator 37 associates the fraction maps or color bands with arbitrary endmember spectra and subsequently generates a new scene. The user can control the component fractions for each pixel and the user is provided with the option of modifying an endmember spectrum to have a specified spectral angle to the background.

Targets can be implanted by any number of methods including selecting a target spectrum from the scene, a spectral library or a formula. Next, a mask plane is generated using a target mask editor, where the values for each pixel represent the target abundance. The background and target masks are combined and then the fractions are re-normalized to sum to 1. Once the targets are in place, the spectral angle between target and background, and the abundance and the noise are varied to examine the robustness of the analysis.

The visualization tools 30 host the Automated Receiver operating Characteristics (ROC) Curve Scorer, ARCS 38. ROC curves are used for algorithm evaluation and false alarm rate definition. One skilled in the art will appreciate that ROC curves are extremely time consuming to produce and have been used in literal identification with imaging sensors, primarily panchromatic and radar.

Hyperspectral imaging sensors introduce several nuances to the ROC methodology, primarily due to their subpixel detection capabilities. The ARCS 38 extends the capability of ROC tools by providing new scoring modes, which include scoring by pixel, scoring by target and scoring by pixel target fraction. In addition, ARCS 38 automates the counting process by utilizing target masks for each of these modes.

A third module of the system 10 are file utilities 40 which include several utility tools for manipulation of spectral cubes and for handling very large files. These tools include a region of interest tool 41, a 3-D binning and patterning selection tool 42 and a file slicer tool 43.

The region of interest tool ROI 41 restricts the processing to a user defined section of the data set. The restricted data set, i.e., a specific region of interest, relieves the user from the burden of repeatedly selecting the region of interest for each subsequent operation.

The 3-D binning and patterned selection tool 42 allows single pass decimation of the data set in three dimensions, two spatial and one spectral, while simultaneously selecting data with user defined strides in all three dimensions. The region of interest selection defines the subset of the data set that is processed during the binning and selection pass.

The file slicer module 43 is a utility that allows for single pass segmentation of the original data set into multiple pieces. The small cubes are used primarily during algorithm development.

Figure 3:
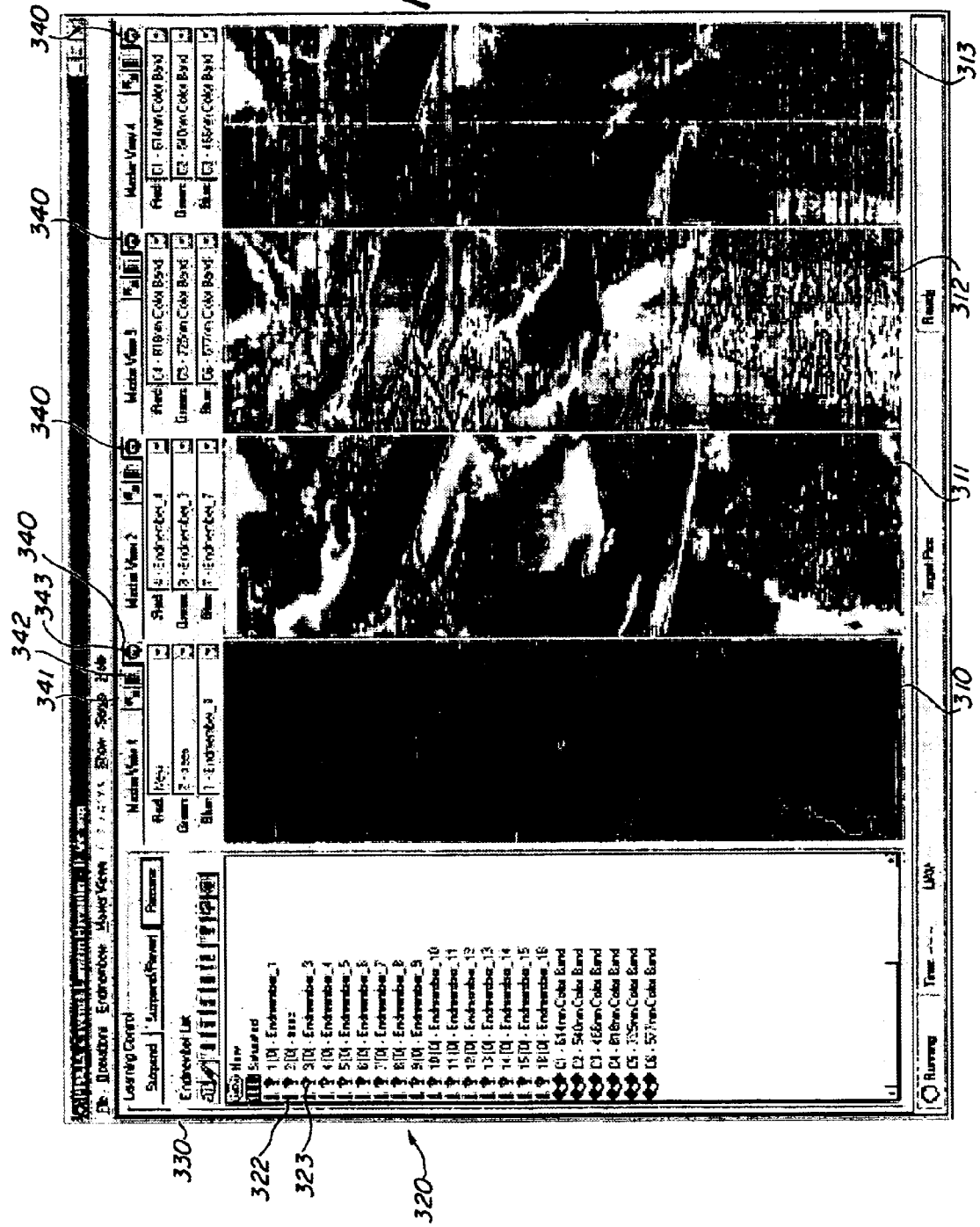
FIG. 3 is a graphic display of another display.

Further understanding of system 10 is provided with reference to the following example which does not limit the scope of the present invention in any way. Description of the following example is made with reference to FIG. 3, which depicts a screen capture of a display view in accordance with the system 10. As described previously, system 10 is adaptable to accept input data provided as output data from ORASIS and to provide that output data in a form to be displayed in an informative and concise manner.

An advantageous and therefore a primary method of displaying the ORASIS data is as output view maps 310–313 in a waterfall-like manner with the scene scrolling down the screen. The user, i.e., operator, is shown the data from the perspective of the devices gathering the data, i.e., as if the operator were actually on the device which captured the data. In this intuitive way, the operator can quickly orient oneself to the spatial scale and setting of the view. The view of FIG. 3 has been configured by the operator as both a true color and a pseudo color image. Additionally, the operator determined that one of the endmembers 320, i.e. Endmember_2 (identified as endmember 322) corresponds to trees and thus, the operator has labeled endmember 322 as such.

The operator can control the number of waterfall views shown. Each of the views is capable of displaying up to three of the planes mentioned above, on the red, green, and blue layers of the view. The intensity of each layer can be independently controlled, and several options exist for displaying the data in meaningful ways.

The operator can choose to look at any of the available endmembers planes, color planes, and the spatial new and saturated planes. The choices are displayed in the endmember list 330. The number of endmember planes vary, depending on the complexity of the scene data and the sensitivity settings in the ORASIS processing. The system 10 allows up to six raw color planes to be selected by the operator in order to give true or pseudo color images of the scene.

At the top of each of the output views, 310–313, is a row of buttons 340 that provide short cuts to quickly access the control of the display. The three smaller buttons, 341–343, can be used to stretch the individual view's contrast as specified in the display properties settings, toggle the view's monochrome mode, and toggle the view's freeze mode.

Since the ORASIS algorithm is adaptive, the list of endmembers changes periodically, and therefore, it is advantageous to be ability to change the view planes quickly and easily. The system 10 can be configured to automatically assist the operator by replacing view planes with the closest match from the updated endmember list. For example, the endmember that finds the trees may be initially endmember 322 in the first endmember set. However, as more exemplars are added to the set, the endmember that finds trees in the now second endmember set, may move to Endmember_3, identified as endmember 323. Conversely, in the second endmember set, the endmember may change only very slightly, and thus keeps its general shape whereby the display system will automatically place the endmember plane data into the view of the previous tree endmember. Thus, trees will continue to be shown on the same view.

The operator may manually set the brightness scale and offset values for the conversion between data values and the resulting intensity of pixels in the displayed plane. Each of the red, green, and blue layers can be set independently. However, the range of endmember data varies widely from one to the next, and setting the scale and offset values manually quickly becomes tedious. Therefore, system 10 is advantageously provided with an automatic contrast stretching function that allows the operator to set up the views, and then allows the system 10 to automatically set the brightness levels.

The ability to control the contrast setting was discovered to be very important to the ability to find anomalies in the scene. The contrast stretching has black and white levels that can be specified as a percent of range or as a number of standard deviations from the mean. The standard deviation stretch technique uses the running averages and standard deviations that are calculated in the demixing process. The displayed pixels can be a range of grayscale intensities between white and black levels, or it can be set to white above and black below a set black level threshold. When a grayscale is selected, the values above the white level can be turned black in order to highlight only the range between the two thresholds.

A combo level option of system 10 combines the grayscale and threshold level selection such that the values between the two threshold levels are a dim grayscale and the values above the white level is given full intensity. This is particularly useful for highlighting potential targets that are picked out well by the displayed endmember plane. However, this depends, in part, on the fact that the number of pixels containing targets is small in comparison to total number of pixels.

Once a suspected target has been identified, the operator can direct a camera or other hyperspectral data sensor relative to the position of the target. The display program provides the means for nominating targets of interest by clicking with the mouse on the suspected targets in any of the waterfall views. The target location is then calculated and sent through a serial communication line to the camera to vary its position and to zoom in or out and to otherwise investigate the area of the target.

To further assist the operator, system 10 has the ability to generate and use endmember libraries via spectral library manager 33. At any point, the operator can add particular endmember spectra to a library with a descriptive label. System 10 can be configured to compare new endmembers with the libraries. If an endmember is known to find targets, it can be added to a library with a label, for example, of Target A. Subsequently, all new endmembers can be automatically compared to this library. If there is a match to an endmember in the library, within a specified tolerance, the label would automatically be placed in the display's endmember list, allowing quick identification.

The invention further includes the use of spatial filters for target discrimination. First the pixels are partitioned into objects. Partitioning is the act of grouping contiguous pixels together to form a single object. A two-dimensional principle component analysis is performed on the resulting objects to determine their length and width. The overall size of each object, measured in total number of lit pixels, is also recorded. Objects can be eliminated from the target may based on lower and upper bounds on their length, width, and size. Objects can also be characterized by their width, length, and size in physical dimensions using the ground sampling distance (GSD) of the instrument from a particular flight. In this manner, objects can be filtered based on actual size as well as pixel dimensions. The actual size is useful for discriminating real targets, while the pixel dimensions are useful for eliminating camera defects.

It will now be apparent to one of ordinary skill in the art that the present invention offers numerous features over prior art visualization and analysis. For example, the present platform is adaptable to provide visualization and analysis utilities for the methods disclosed in both "Hyperspectral analysis and target detection system for the Adaptive Spectral Reconnaissance Program (ASRP)", John M. Grossmann et al.; and "Evaluation of Endmember Selection Techniques and Performance Results from ORASIS Hyperspectral Analysis", Kwok Yeung Tsang et al., both herein incorporated by reference.

In addition, the present platform can further serve as the interface or environment for the Intelligent Hypersensor Processing System (IHPS), as well as its extensions and other similar hyperspectral data analysis systems. The present platform further provides the means for rapid analysis and visualization of hyperspectral data sets that contain small, weak or hidden objects, substances, or patterns embedded in complex backgrounds, as well as a visual front end to the ORASIS algorithm.

Further, the present system is adaptable for use as the user interface for real-time acquisition, field flattening, radiometric calibration, and smile and sensor rotation correction of hypersensor data.

Additionally, the present system is adaptable to utilize several forms of software plug-in technology to provide rapid integration of new algorithms or science products produced from ORASIS endmembers, such as bathymetry, water clarity, terrain categorization, automated target recognition, spatial transforms and filters.

Although the invention has been described above in relation to preferred embodiments thereof, it will be understood by those skilled in the art that variations and modifications can be effected in these preferred embodiments without departing from the scope and spirit of the invention.

What is claimed is:

1. A method for defining targets in hyperspectral image data of a scene, comprising the steps:

identifying a target within said scene;

fitting a plurality of conjoined hyperplanes about said target in said scene; and fitting a shape to said identified target by shrinkwrapping said hyperplanes about said target by translating and rotating said hyperplanes until a specified fit parameter is satisfied.

2. A method as in claim 1, further comprising the step of spatial filtering to produce further information about the target.

3. A method as in claim 1, further comprising the steps of:

obtaining pixels representing the target and other information present in a locale of the target;

partitioning the pixels into objects;

performing a two-dimensional principle component analysis on the objects to determine a width and length of each of said objects;

obtaining the overall size of each of said objects measured in total number of lit pixels; and selectively eliminating some of said objects, said elimination being based on actual size, pixel dimensions, or both said actual size and pixel dimensions, as selective elimination criteria.

* * * * *